United States Patent [19]
Burgett et al.

[11] Patent Number: 5,521,795
[45] Date of Patent: May 28, 1996

[54] SOLENOID MOUNTING APPARATUS

[76] Inventors: Kirk Burgett, 4705 Firebird La., Carmichael, Calif. 95608; Alpha Cheung, 8006 Deer Water Dr., Sacramento, Calif. 95823

[21] Appl. No.: 349,557

[22] Filed: Dec. 5, 1994

[51] Int. Cl.⁶ .................................................. H02B 1/01
[52] U.S. Cl. ..................... 361/825; 361/796; 361/815; 361/823; 174/50; 248/500; 211/41
[58] Field of Search .................................... 361/782, 796, 361/825, 815, 823; 248/500, 65, 121, 127; 211/41, 94; 84/111, 112, 113, 246, 423 R, 17, 18, 20, 22, 107; 174/50

[56] References Cited

U.S. PATENT DOCUMENTS

| | | |
|---|---|---|
| 3,426,304 | 2/1969 | Cannon et al. . |
| 3,581,254 | 5/1971 | Cannon et al. . |
| 3,581,255 | 5/1971 | Cannon et al. . |
| 4,031,796 | 6/1977 | Wilkes . |
| 4,121,491 | 10/1978 | Wilkes . |
| 4,513,652 | 4/1985 | Muramatsu et al. . |
| 5,251,529 | 10/1993 | Burgett .................................. 84/423 R |

*Primary Examiner*—Gerald P. Tolin
*Assistant Examiner*—Y. Whang
*Attorney, Agent, or Firm*—James M. Ritchey

[57] ABSTRACT

For use with a key in a keyboard instrument, a solenoid mounting apparatus for releasably securing solenoid assemblies has a mounting rail with essentially flat first and second faces, first and second end edges, and first and second mounting edges. Solenoid assembly securing channels are formed into each mounting edge. Included in the solenoid assemblies are brackets for retaining each of the solenoids to the rail and a threaded member for releasably anchoring each bracket to either of the channels.

5 Claims, 4 Drawing Sheets

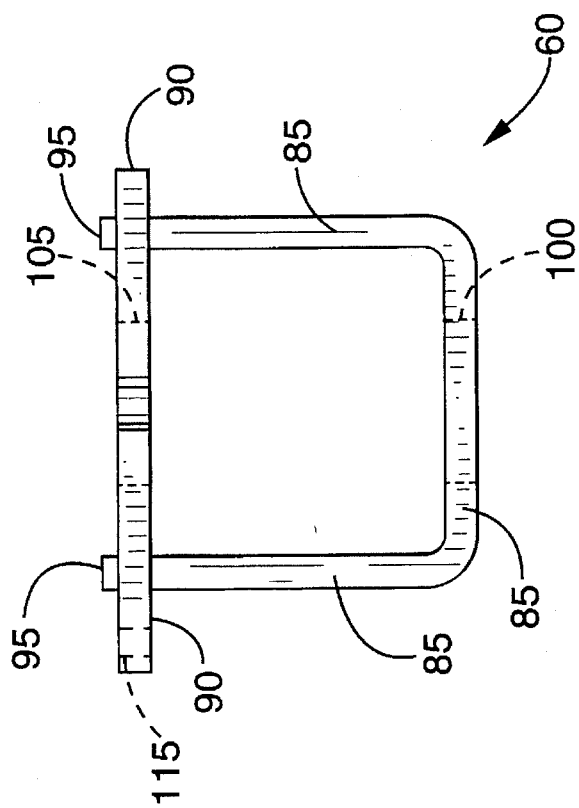
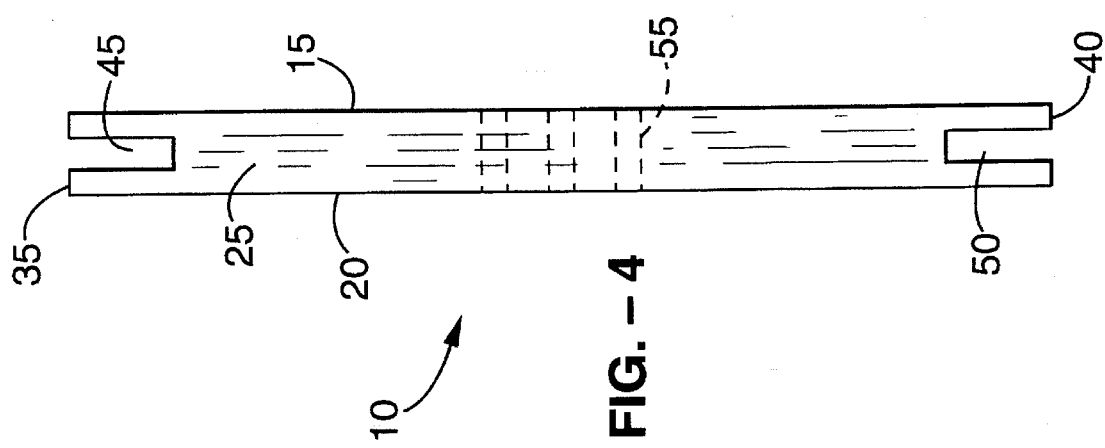

SOLENOID MOUNTING APPARATUS

BACKGROUND OF THE INVENTION

1. Field of the Invention

A mounting or fastening apparatus for releasably securing key striking solenoid assemblies to a keyboard musical instrument is presented. In particularly, the present invention relates to a solenoid mounting apparatus having an adjustable or releasable mounting means for attaching to the keyboard instrument a plurality of solenoid key striking assemblies. The mounting apparatus has a mounting rail with first and second generally flat and parallel faces, first and second end edges, and first and second mounting edges. A first channel is formed within the first mounting edge and usually extends between the first and second end edges. Likewise, a second channel is formed within the second mounting edge and usually extends between the first and second end edges.

2. Description of the Background Art

Many of the present assemblages with attachment means for securing solenoid assemblies to a keyboard instrument include elements that are often cumbersome to mount or adjust, too large for use in the narrow spaces near many keyboards, or, when small enough to fit within a cramped keyboard space, deliver a weak striking force to the associated keys.

Related in U.S. Pat. No. 3,426,304 is a player piano key actuating solenoid valve assembly. Comprising the disclosed solenoid mounting assembly is a pair of generally "C" shaped structures. Each solenoid is secured between the pair of "C" shaped structures. Multiple layers of solenoids may be held with this design.

An adjustably mounted player piano key actuating assembly is presented in U.S. Pat. Nos. 3,581,254 and 3,581,255. "C" shaped and "L" shaped solenoid mounting rails are provided, respectively. The horizontal projections producing the "C" and "L" shapes support brackets attached to the solenoids.

U.S. Pat. No. 4,031,796 describes a solenoid mounting assembly for musical keyboards. The disclosed assembly has parallel locking slots that run the length of the rail's longitudinal borders. To secure the solenoids, a protruding rib with opposing grooves cooperates with the locking slots. Each of the locking slots has means for threadably receiving a threaded fastener member. This slot element of the invention requires that the locking slot be deep enough to accept securely the threaded fastener. Therefore, as the drawings clearly indicate, each locking slot is "X" shaped so that a fastener can protrude through the threadable locking means. By necessity, this design requires that the thickness of the rail be of appropriate dimensions to accommodate the protruding fastener. As indicated above, the available leeway for positioning solenoids is often severely restricted near a keyboard. The minimum rail thickness required by this design inherently limits the structural locations in which the device will fit.

Disclosed in U.S. Pat. No. 4,121,491 is a solenoid mounting rail for a musical keyboard instrument that is very similar to the rail detailed in U.S. Pat. No. 4,031,796. The exhibited invention has two critical differences from that described in the above U.S. Pat. No. 4,031,796 solenoid mounting rail. First, alignment rib on the longitudinal edges of the planar surfaces of the rail have been added. These alignment ribs project outward from the surface of the rail and accept solenoid edges for mounting alignment. Second, the grooved rib for cooperatively holding the solenoids has been replaced by a locking slot like those disclosed in U.S. Pat. No. 4,031,796. As with the U.S. Pat. No. 4,031,796 mounting rail, this version must have an appropriate rail thickness to accommodate the locking nuts and the associated fastener, thereby limiting its use in narrow spaces.

U.S. Pat. No. 4,513,652 presents, for illustrative purposes, one possible type of solenoid actuator for keyboard instruments. This disclosure stresses the desirability of producing components that are small in size in order to fit within the restricted available space near a keyboard.

A convenient to use mounting rail, but one that is more bulky than the subject invention, is disclosed in U.S. Pat. No. 5,251,529 for keyboard instruments. It comprises a mounting rail having a top border and a bottom border, a front mounting rail surface, a back mounting rail surface, two opposing end borders, a top lip proximate the top border, a bottom lip proximate the bottom border, wherein the top and bottom lips project outward past the back mounting rail surface, a top clamping channel in the back rail surface proximate the top lip, and a bottom clamping channel in the back rail surface proximate the bottom lip. Included in the subject system is a solenoid assembly having an invertable supporting frame for clamping over either the top border or the bottom border. Means are associated with the supporting frame for clamping the solenoid assembly to the mounting rail proximate either the top or the bottom border. Also, means are provided on the back mounting rail surface, proximate the top and bottom borders, for cooperating with the frame clamping means for fastening the solenoid assembly to the mounting rail. Additionally, means are incorporated in the subject device for adjustably securing the rail to the keyboard instrument.

SUMMARY OF THE INVENTION

An object of the present invention is to provide a solenoid mounting rail that can be utilized in narrow regions of a keyboard instrument.

Another object of the present invention is to disclose a solenoid mounting rail that permits a user to quickly and accurately attach solenoids.

A further object of the present invention is to supply a solenoid mounting rail that is simple to fabricate yet is sturdy, compact, and easy to employ in confined spaces within a typical keyboard instrument.

Disclosed, for use in actuating a key in a keyboard instrument, is a solenoid mounting apparatus for releasably securing a plurality of solenoids. The subject invention comprises an essentially rigid and elongated mounting rail having first and second faces, first and second end edges, and first and second mounting edges. A first channel is formed within the first mounting edge and usually extends between the first and second end edges for releasably securing the solenoids to the rail. Preferably, a second channel is formed within the second mounting edge and usually extends between the first and second end edges. Included is a bracket for retaining each of the solenoids to the rail and means for releasably anchoring the bracket to either the first or the second channels. The bracket comprises a solenoid retaining frame (the closed portion of a generally "P" shaped structure) at least partially surrounding each of the solenoids and a support member (the leg portion of a generally "P" shaped structure) projecting from the solenoid retaining frame. Usually, the bracket anchoring means comprises a threaded member which enters within either the first or the second channels for releasably anchoring the bracket.

Other objects, advantages, and novel features of the present invention will become apparent from the detailed description that follows, when considered in conjunction with the associated drawings.

BRIEF DESCRIPTION OF THE DRAWINGS

FIG. 4 is a side view of the mounting rail of the subject invention.

FIG. 5 is a side view of the solenoid bracket of the subject invention.

DESCRIPTION OF THE PREFERRED EMBODIMENT

Figure 1:
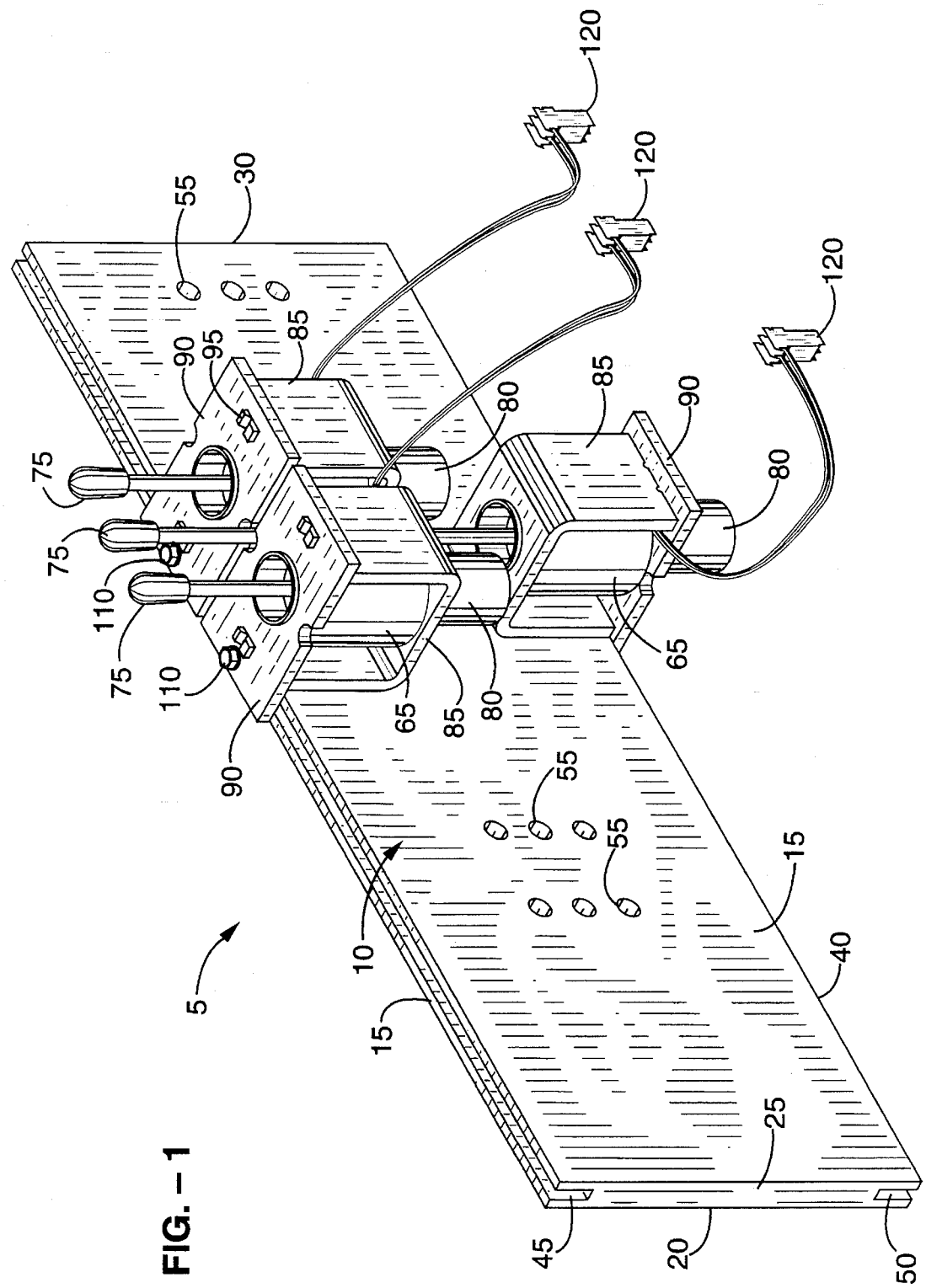
FIG. 1 is a perspective view of the subject invention showing mounted solenoid assemblies.

Referring now to FIGS. 1–5, there is shown a preferred embodiment of a solenoid mounting apparatus 5 for use with a keyboard or similar musical instrument and the like. Keyboard musical instruments may have each key actuated by a solenoid delivered force. Player pianos, organs, synthesizers, and similar instruments may have manual or automation enhancements that employ solenoids to strike appropriate keys. In order that a high longitudinal mounting density for solenoids is achieved in the preferred embodiment of the subject invention, two usually parallel, alternating rows of solenoid assemblies are secured to a mounting plate or rail 10.

Generally, the subject invention comprises a mounting rail having essentially flat first and second faces, first and second end edges, and first and second mounting edges. Included are first mounting means shaped into the first mounting edge and second mounting means shaped into the second mounting edge. Further, provided is a bracket for retaining each solenoid and means for releasably anchoring each bracket to either the first or the second mounting means.

More specifically, the subject apparatus incorporates an essentially rigid, elongated, and usually rectangular solenoid mounting plate rail 10. The rail 10 has essentially flat first 15 and second 20 faces. Opposing first 25 and second 30 end edges are included along with opposing first 35 and second 40 mounting edges. The dimensions of the rail 10 are adjusted to permit its insertion within an instrument, proximate the keyboard. Since the rail 10 is relatively thin, most keyboard instruments easily receive the rail 10 in a position suitable for use in striking the keys with the associated solenoids.

As the rail's 10 solenoid attachment means, a first channel 45 is formed within the first mounting edge 35. Likewise, a second channel 50 is formed within the second mounting edge 40. Usually, the first 45 and second 50 channels extend between the first 25 and second 30 end edges. However, even though the channels 45 and 50 usually extend the length of each mounting edge 25 and 30 (which generally simplifies the manufacturing process), the channels 45 and 50 may terminate before reaching the end edges 25 and 30.

Installation of the subject apparatus 5 within a keyboard instrument comprises attaching the solenoid mounting plate or rail 10 to a suitable instrument support via mounting rail apertures 55. Conveniently positioned throughout the rail 10 are apertures 55 having dimensions suitable for receiving support fasteners such as screws, bolts, and similar devices. Given the variability of supports found in different keyboard instruments, the plurality of apertures 55 permits a user a wide latitude of installation configurations and adjustments.

Although the preferred device attaches on a customarily elongated, planar surface of an appropriate instrument, it is envisioned that curved instrument surfaces may be encountered and the device so adapted. Usually, rigid materials are employed to produce the rail 10, preferably aluminum, steel, or other like metals and metal alloys. Although not preferred, natural or synthetic polymers and similar materials may find use in creating the rail 10. As noted in more detail below, threads on a threaded member need to deform or cut into the material from which the rail 10 is fabricated, therefore, the selected rail 10 material must be able to be at least partially carved or incised by the material of the threaded member. Methods of fabricating the rail 10 such as pressing, rolling, extruding, milling, molding, and similar procedures are contemplated by this disclosure.

As depicted, adjustably secured over each mounting edge 35 and 40 and against a face 15 or 20 of the mounting rail 10 are solenoid assemblies. Each solenoid assembly is adjusted along the rail 10 to position it beneath the key to be struck by that assembly's activation. Since the available space near the keys is limited, by having staggered rows of solenoid assemblies a sufficient number of assemblies are compacted into the given space to strike every key in the keyboard. Each solenoid assembly comprises a solenoid mounting or supporting bracket 60 (seen in side view in FIG. 5) and a solenoid having an electromagnet 65 (usually cylindrical), a top mounting edge plunger 70a or a bottom mounting edge plunger 70b, a resilient plunger bumper 75, and a plunger housing 80. Additionally, within the housing 80 is a suitably adapted spring to cushion the returning plunger when the activating electrical signal is terminated. To strike with a plunger a specific key in the instrument, with a particular force and for a desired duration to generate the selected sound, an electronic signal is sent to the magnet of the solenoid assembly located proximate the key. Upon termination of the signal the plunger returns to a rest position.

A particularly useful and cost limiting feature of the subject invention is the ability of using the same solenoid supporting bracket 60 on either the first (top) 35 or second (bottom) 40 rail mounting edges. Flipping the bracket 60 up-side-down permits its use on either rail mounting edge 35 or 40.

Although other equivalent forms are contemplated to be within the realm of this disclosure, preferably, the solenoid bracket 60 comprises an associated or partially surrounding retaining frame or cowling 85 and a rail attachment or support member 90. Usually the solenoid retaining frame 85 has a generally U-shaped configuration. The support member 90 projects away from the solenoid retaining frame 85. The "U" shaped solenoid retaining frame 85 at least partially surrounds the solenoid (magnet in particular) and the solenoid support member 90 is secured across the open top or the "U" shaped solenoid retaining frame 85. The solenoid support member 90 contacts either the first (the first mounting edge 35 in combination with the first channel 45) or the second (the second mounting edge 40 in combination with the second channel 50) mounting means.

Overall, the solenoid bracket 60 has the general appearance of a "P" shaped structure or frame with the closed portion of the "P" shape at least partially surrounding the solenoid magnet 65. The leg portion of the "P" shape projects from the closed portion and contacts either the first mounting edge 35 and associated first channel 45 or, if mounted up-side-down, the second mounting edge 40 and associated second channel 50.

Preferably, the solenoid retaining frame or cowling 85 folds around the magnet 65 and including the solenoid support member 90 forms a surrounding partial enclosure for the magnet 65. Although other equivalent means, such as welding, brazing, and the like, are contemplated, usually, the retaining frame 85 is attached to the support member 90 by means of clips or inserts 95 that fit through receiving apertures in the solenoid support member 90 and are deformed to secure the two (support member 90 and retaining frame 85) together.

Suitable solenoid holding apertures 100 and 105 are formed in the solenoid retaining frame 85 and the solenoid support member 90, respectively. Each solenoid holding aperture 100 and 105 are of the same general size so any particular solenoid fits either right-side-up or up-side-down, depending on its mounting position on the subject rail 10.

Incorporated into each solenoid bracket 60 of each solenoid assembly are means for adjustably anchoring each solenoid assembly to the mounting rail 10 on either the first 35 or second 40 mounting edges. Although equivalent means are within the purview of this disclosure, preferably, the anchoring means comprises a threaded member 110 which enters and cooperates with either the first 45 or the second 50 channels for releasably anchoring the bracket 60. The threaded member 110 is a bolt, screw, or the like and fits through an aperture 115 formed in the support member 90 (see FIG. 5). The threaded portion of the member 110 enters a channel 45 or 50 contacts the inner sides of a channel 45 or 50. The width of each of the channels 45 and 50 is slightly smaller than the outer thread diameter of each of the threaded members 110. Therefore, during appropriate rotation of the member 110 for channel 45 or 50 entry, the threads of the threaded member 110 cut into the railing material to secure each solenoid assembly to the rail 10. Thus, usually the threaded member 110 is a "self-tapping" type of bolt, screw, or similar attachment means. Alternatively, the threads may not only cut into the material of the rail 10, but partially widen the channel 45 or 50 and the threaded member 110 enters the channel 45 or 50, thereby being firmly gripped by the forced open channel 45 or 50. A slightly smaller channel width to outer thread diameter ratio implies a size difference that permits sufficient final frictional interactions to securely fasten the solenoid assembly to the rail 10. For removal of the solenoid assembly from the rail 10, the threaded member 110 is loosened by reversing the rotation needed to secure the member 110 within the channel 45 or 50.

Figure 2:
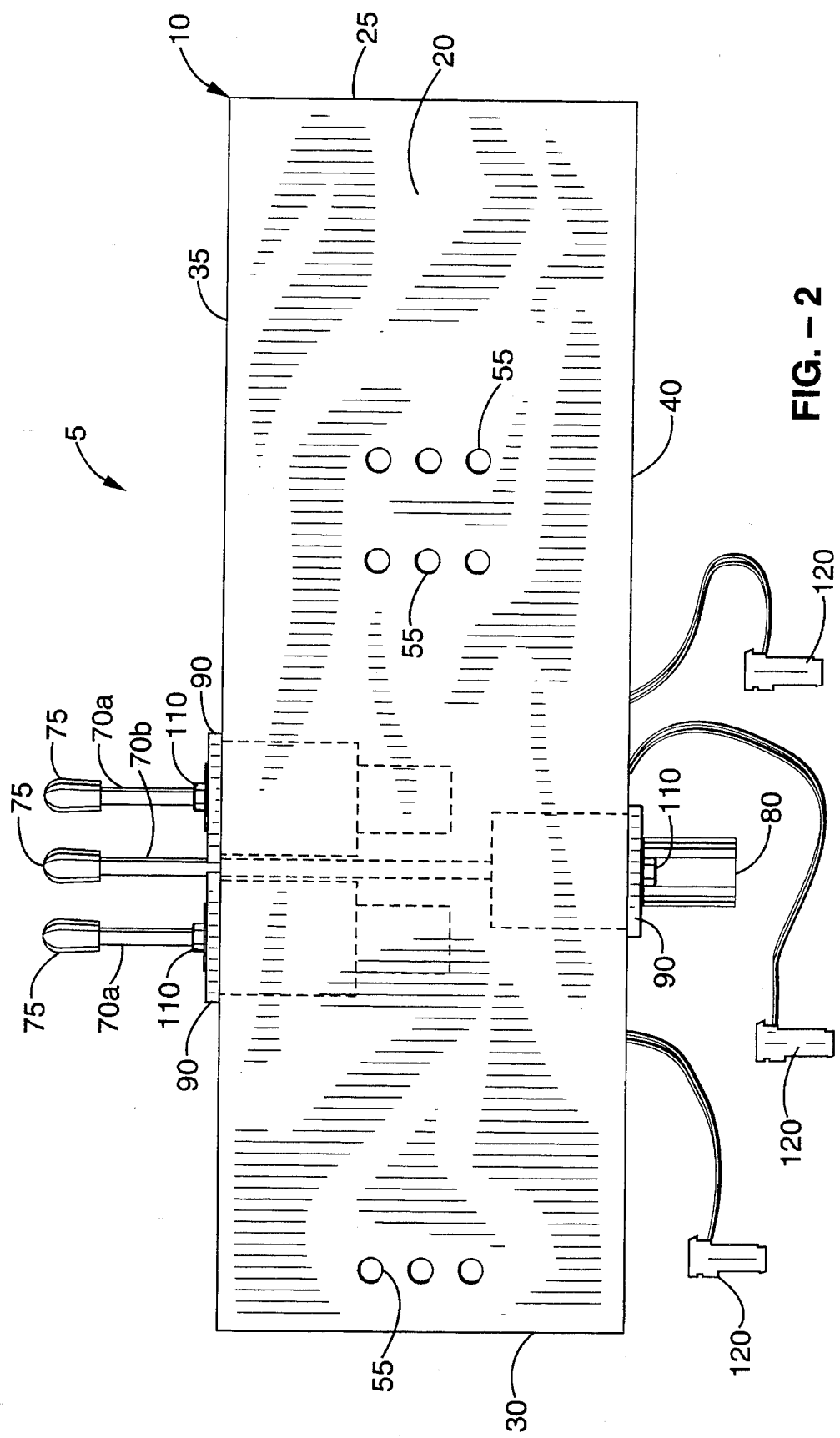
FIG. 2 is a back view of the subject invention showing mounted solenoid assemblies.
Figure 3:
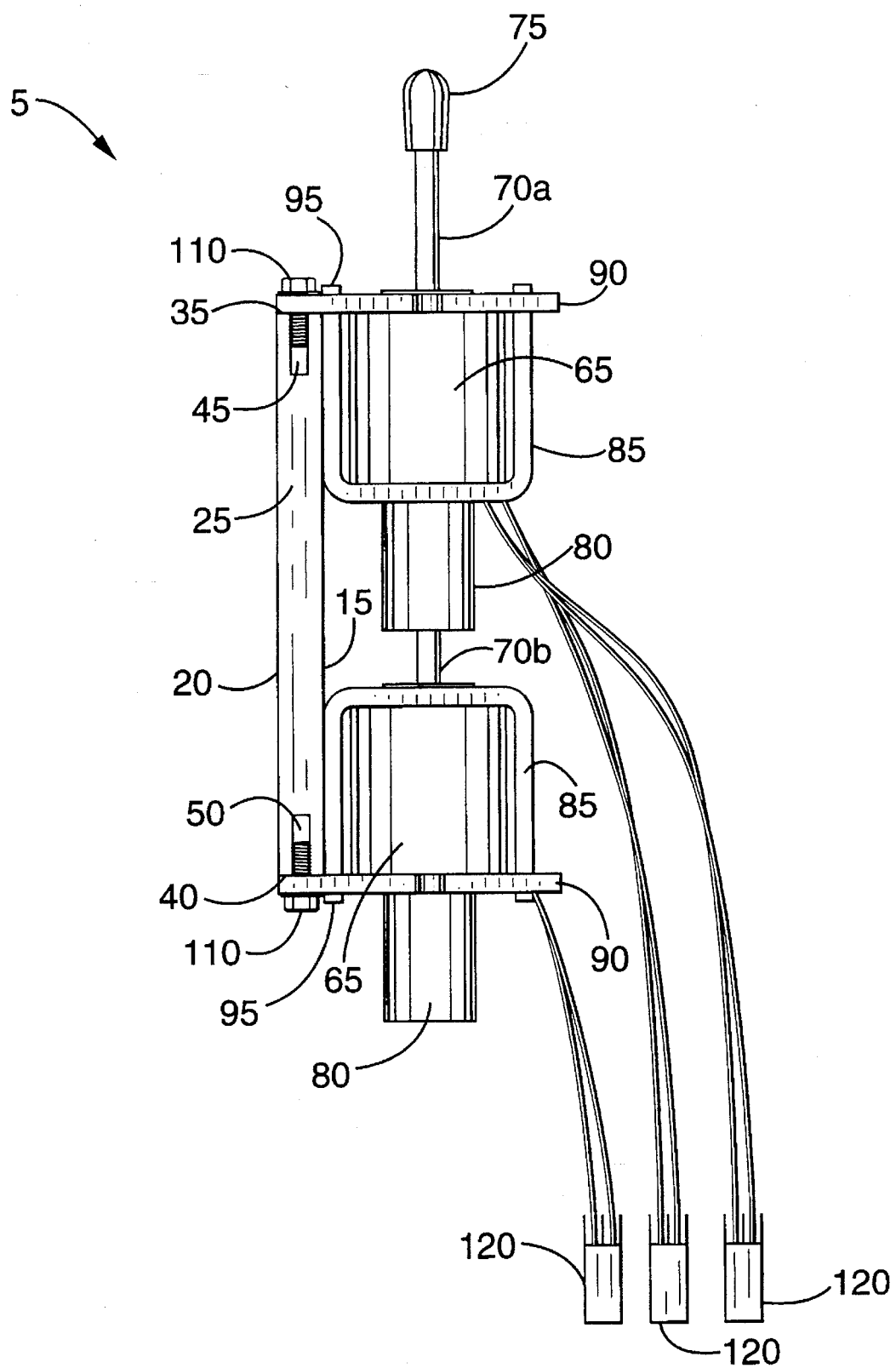
FIG. 3 is a side view of the subject invention showing mounted solenoid assemblies.

Usually, to assist in stabilizing the mounted solenoid assemblies, each solenoid assembly fits against either the first mounting edge 35 or the second mounting edge 40 and contacts either the first 15 or second 20 rail surface. It is noted that although FIGS. 1–3 depict the solenoid assemblies mounted only on the first rail surface 15, since the rail 10 is symmetrical, the solenoid assemblies can be mounted on either side or, in some situations, on both the first 15 and second 20 sides simultaneously.

As noted above, each solenoid assembly contains an electromagnet 65. Extending from each magnet 65 is a striking signal coupling means, preferably, electrical conductors that terminate in suitable couplers 120.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use in actuating a key in a keyboard instrument, a solenoid mounting apparatus for releasably securing at least one solenoid, comprising:

a) a mounting rail having essentially flat first and second faces, first and second end edges, and first and second mounting edges;

b) first mounting means shaped into said first mounting edge;

c) second mounting means shaped into said second mounting edge;

d) a bracket for retaining the solenoid wherein said bracket comprises a "U" shaped frame at least partially surrounding the solenoid and a solenoid support member secured across the open top or said "U" shaped frame, wherein said solenoid support member contacts said mounting rail; and e) means for releasably anchoring said bracket to said mounting rail.

2. For use in actuating a key in a keyboard instrument, a solenoid mounting apparatus for releasably securing at least one solenoid, comprising;

a) a mounting rail having essentially flat first and second faces, first and second end edges, and first and second mounting edges;

b) first mounting means shaped into said first mounting edge;

c) second mounting means shaped into said second mounting edge;

d) a bracket for retaining the solenoid; and e) means for releasably anchoring said bracket to said mounting rail; wherein said bracket anchoring means comprises a threaded member which cooperates with one of said first and said second mounting means for releasably anchoring said bracket.

3. For use in actuating a key in a keyboard instrument, a solenoid mounting apparatus for releasably securing a plurality of solenoids, comprising:

a) a mounting rail having first and second faces, first and second end edges, and first and second mounting edges;

b) a first channel formed within said first mounting edge for releasably securing the solenoids to said rail;

c) a second channel formed within said second mounting edge for releasably securing the solenoids to said rail;

d) a bracket for retaining each of the solenoids to said rail, wherein said bracket comprises a "U" shaped frame at least partially surrounding the solenoid and a solenoid support member secured across the open top or said "U" shaped frame, wherein said solenoid support member contacts said mounting rail; and e) means for releasably anchoring said bracket to said mounting rail.

4. For use in actuating a key in a keyboard instrument, a solenoid mounting apparatus for releasably securing a plurality of solenoids, comprising:

a) a mounting rail having first and second faces, first and second end edges, and first and second mounting edges;

b) a first channel formed within said first mounting edge for releasably securing the solenoids to said rail;

c) a second channel formed within said second mounting edge for releasably securing the solenoids to said rail;

d) a bracket for retaining each of the solenoids to said rail; and e) means for releasably anchoring said bracket to said mounting rail, wherein said bracket anchoring means comprises a threaded member which enters within one of said first and said second channels for releasably anchoring said bracket to said rail.

5. For use in actuating a key in a keyboard instrument, a solenoid mounting apparatus for releasably securing a plurality of solenoids, comprising:

a) an essentially rigid and elongated mounting rail having first and second faces, first and second end edges, and first and second mounting edges;

b) a first channel formed within said first mounting edge and extending between said first and second end edges for releasably securing the solenoids to said rail;

c) a second channel formed within said second mounting edge and extending between said first and second end edges for releasably securing the solenoids to said rail;

d) a bracket for retaining each of the solenoids to said rail; and e) means for releasably anchoring said bracket to said mounting rail, wherein said bracket anchoring means comprises a threaded member which enters within one of said first and said second channels for releasably anchoring said bracket.

* * * * *